United States Patent [19]

Goldman

[11] Patent Number: 4,512,245
[45] Date of Patent: Apr. 23, 1985

[54] PORTABLE POINT SOURCE ADSORBER
[75] Inventor: Max Goldman, Latham, N.Y.
[73] Assignee: Adsorbent Products Inc., Latham, N.Y.
[21] Appl. No.: 662,942
[22] Filed: Oct. 19, 1984

Related U.S. Application Data

[63] Continuation-in-part of Ser. No. 422,757, Sep. 24, 1982, abandoned.

[51] Int. Cl.³ .............................................. F24F 11/00
[52] U.S. Cl. .................................... 98/115.4; 55/419; 55/DIG. 18
[58] Field of Search ...... 98/115 R, 115 LH, 115 VM; 55/385, DIG. 18, 419; 51/273

[56] References Cited

U.S. PATENT DOCUMENTS

| | | | |
|---|---|---|---|
| 4,129,426 | 12/1978 | Furåsen | 55/176 X |
| 4,292,061 | 9/1981 | Land | 55/509 X |
| 4,312,291 | 1/1982 | Knab | 98/115 LH |

OTHER PUBLICATIONS

ITT Holub Industries, Sycamore, IL, Marketing Literature, 1977, Product #35-120.

Primary Examiner—William E. Wayner
Assistant Examiner—John Sollecito

[57] ABSTRACT

Disclosed is a portable apparatus which adsorbs trace toxic fumes for a wide diversity of situations. The apparatus consists of a gas-tight enclosure, attached flexible duct and floating support arm, adsorbent filter, exhauster blower and quick disconnect fasteners. The blower sucks the toxic fumes through the filter and discharges the treated air back into the laboratory. The flexible duct/floating arm captures the toxic fumes in a wide range of conditions and the quick disconnect fasteners permit the rapid replacement of spent filters. It is the quick-disconnect fasteners between the cover of the box and between the filter and the cover which permit rapid replacement of the spent filters. This flexible apparatus minimizes interference with visual and hand operations, conserves room energy, removes particulate by both the change in direction designed in the apparatus and the non-woven fabrics used to support the adsorbent particle bed. One embodiment of the portable apparatus includes a table box having a foraminous surface onto which a specimen which emits fumes is placed, with the table box being in communication with the gas-tight enclosure so that fumes which are heavier-than-air are sucked into the table box and then into the gas-tight enclosure, while the placement of the flexible duct above the specimen conducts fumes which are lighter-than-air directly into the gas-tight enclosure.

18 Claims, 9 Drawing Figures

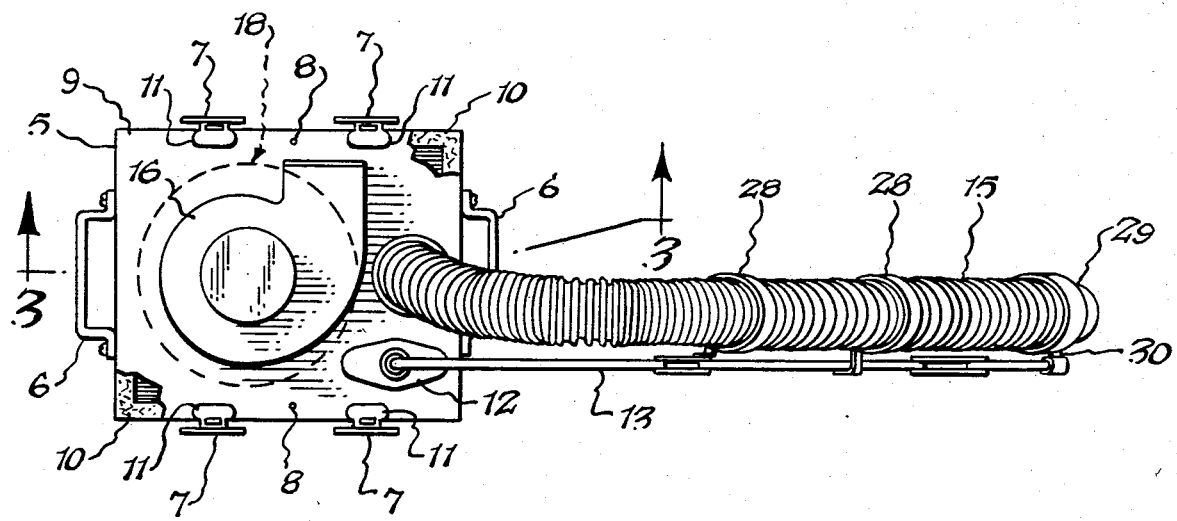
Fig. 1.
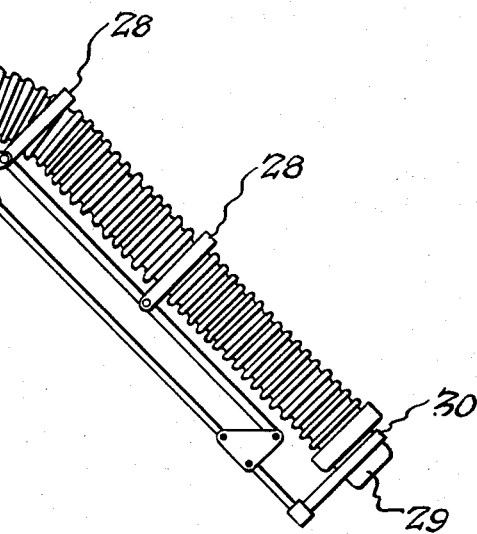
Fig. 2.
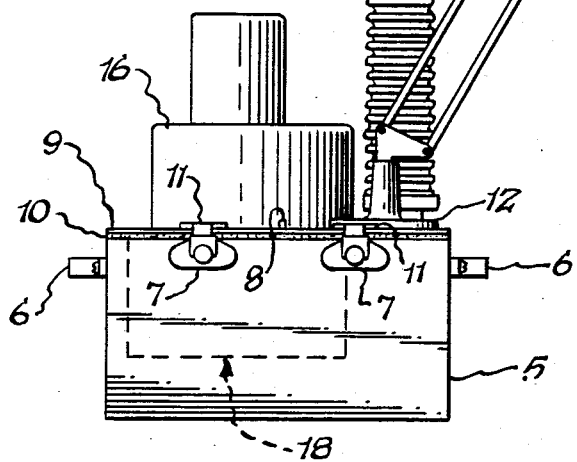

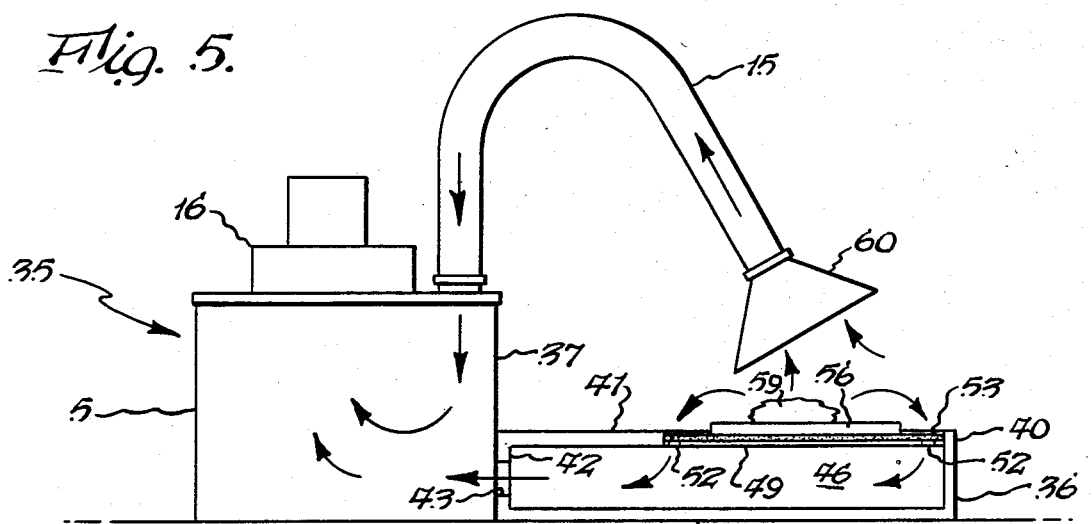
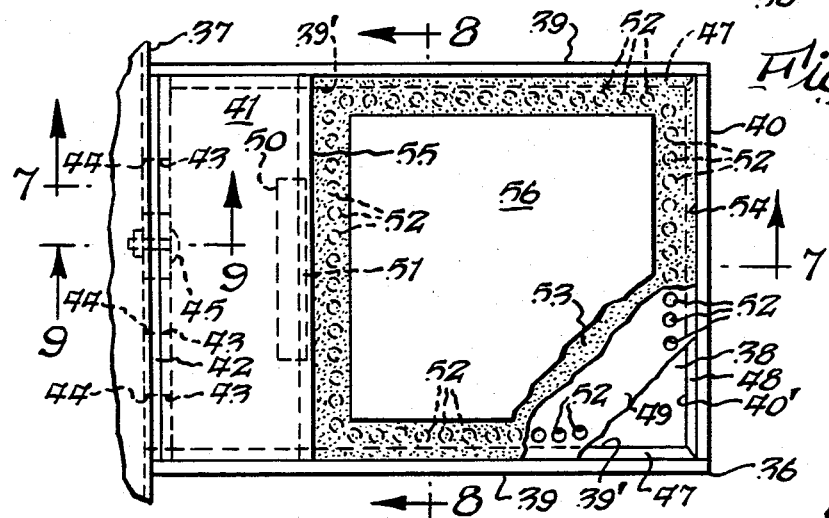
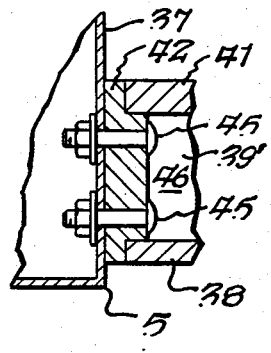
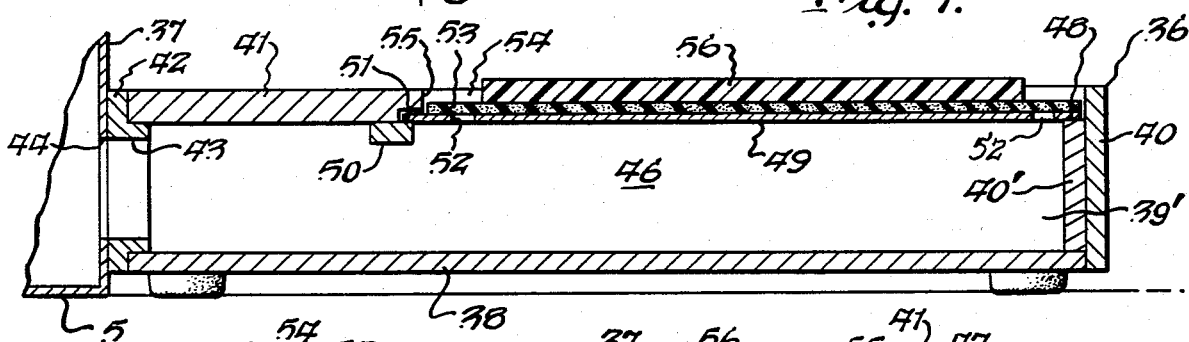
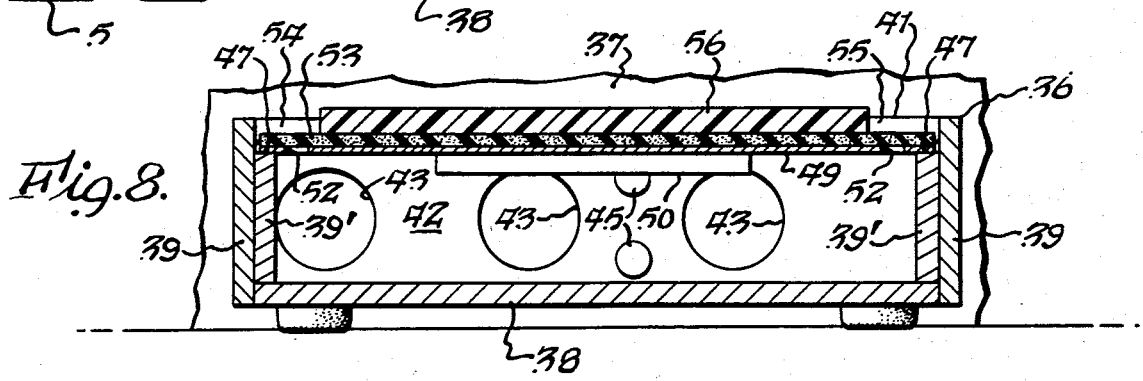

PORTABLE POINT SOURCE ADSORBER

CROSS REFERENCE TO RELATED APPLICATION

The present application is a continuation-in-part of application Ser. No. 422,757, filed Sept. 24, 1982 now abandoned.

BACKGROUND OF THE INVENTION

This invention relates to an improved portable adsorber which specifically can treat fumes at point sources generated from procedures and equipment and which can capture fumes emanating from the point source which are both lighter-than-air and heavier-than-air, thereby preventing such fumes from migrating into the room in which the point source is located.

Histopathology and graphic arts are two of many areas where this portable adsorber would protect the artisan from the toxic fumes used in their work. In histopathology, the laboratory technician in routine procedures allows OSHA (Occupational Safety Health Administration) regulated solvents to escape into the laboratory environment. By simply opening the tissue specimen container, where the tissue is routinely preserved in formalin (an aqueous solution of formaldehyde), formaldehyde gas is allowed to escape into the room environment. Recent findings by the CIIT (Chemical Industry Institute of Toxicology) that experimental testing with rats exposed to formaldehyde resulted in squamous cell carcinomas and the Consumer Products Safety Committee's ban on urea-formaldehyde insulation bring forward the prospect that formaldehyde could be classified as a cancer-suspect agent which causes concern in the medical area because of formaldehyde's prevalent use. Similarly xylene and alcohol, both OSHA regulated substances are used extensively in staining and coverslipping slides in the medical area.

Similarly, an artist uses hazardous solvents to dissolve and mix with oil, resins, varnishes and inks and to remove paint, dyes, varnish and lacquers from brushes, tools and hands. In addition to the inhalation effects of these solvents (drowsiness), these solvents are flammable and serious incidents have occurred. The artist and histologist have to be able to perform their craft with minimum interference to their ability to use the hands and eyes and this invention affords that opportunity with a large measure of protection for the artisan.

Normal protection in the medical laboratory is afforded by working in a laboratory hood where sufficient velocity is maintained to capture the solvent and exhaust the fume into the outside environment. To achieve the high capture velocity (150 feet per minute) required in the hood, the sash is frequently closed to reduce the hood opening and thus obtain the high capture velocity required. Since large ventilation systems, to which a laboratory hood is connected, required frequent balancing which has become even more critical with the universality of air conditioning; often fumes exhausted from one laboratory hood are re-introduced unintentionally into another part of the ventilation system instead of outdoors. The EPA (Environmental Protection Agency) requires treatment of carcinogen and regulates the introduction of organic emissions into the ambient environment.

To reduce the large loss of energy involved in providing the capture velocity required to exhaust the fumes and to treat fumes at their source of generation prior to dilution, fume adsorbers which enclose the procedure or equipment have been developed (U.S. Pat. No. 4,276,819). Fume adsorbers are deficient in that they are small to achieve a measure of portability yet require a balance between adsorbent depth and capture velocity to achieve treatment and yet prevent fume escape. Fume adsorbers do not achieve the capture velocities of laboratory hoods and result in reduction of visual and hand manipulation ability.

By way of background, to provide protection during welding U.S. Pat. No. 3,818,817 describes a flexible duct supported on a floating arm connected to a permanently mounted blower which exhausts particulate fumes external to the building. A large amount of room energy is lost in this pollution control method. U.S. Pat. No. 3,926,104 describes a welding pollution control system where particulates are treated by electrostatic means and the treated air can be recirculated back into the room. Flexibility of this treatment system is reduced since the local exhaust hood and electrostatic treatment unit have to be positioned over the work. All situations where it could be used dictate that a large open overhead space be available over the fume generating source. U.S. Pat. No. 4,318,337 describes a special molded fiberglass local exhaust hood to increase the capture of the welding fumes. The described mounting appears less flexible than the floating arm/duct arrangement. The treatment techniques described in U.S. Pat. No. 4,318,337 involve electrostatic precipitation and solvent recovery which are both large systems not lending themselves to portability. U.S. Pat. Nos. 3,913,470 and 3,380,371 describe large exhaust systems with unique manifolding to locate the local exhaust hood over the fume generating source.

In addition, there are situations where the noxious fumes and vapors which are emitted from a point source are both lighter-than-air and heavier-than-air. Thus, prior point source adsorbers in which the fume-capturing duct was located above the point source could only capture the lighter fumes while permitting the heavier fumes to migrate downwardly.

SUMMARY OF THE INVENTION

It is one object of the present invention to provide an improved portable adsorber and filter unit in which the blower and filter and inlet conduit are mounted on the cover of the box so that removal of the cover provides access to all of the components thereon.

Another object of the present invention is to provide an improved protable adsorber wherein the box cover which mounts the filter is attached to the box by first quick disconnect fasteners and wherein the filter is mounted on the inside of the cover by second quick disconnect fasteners so that there can be rapid access to the filter for rapid replacement.

A further object of the present invention is to mount a filter and the inlet to the box of a portable adsorber so that the gases passing through the box must turn 180°.

Still another object of the present invention is to provide an improved point adsorber which will capture fumes and vapors emanating from a point source which are both lighter-than-air and heavier-than-air. Other objects will readily be perceived hereafter.

The present invention relates to a portable point source filter comprising a gas-tight box, a removable cover on said gas-tight box, an outer surface and an inner surface on said cover, an exhauster blower mounted on said outer surface, filter means mounted on said inner surface in communication with said exhauster blower whereby gases passing through said box must pass through said filter means, and conduit means in communication with said box for conducting gases thereto.

The present invention relates to a portable point source filter for adsorbing both lighter-than-air fumes and heavier-than-air fumes from a fume emitting specimen comprising a gas-tight box, an exhauster blower mounted on said gas-tight box for exhausting gases from said box, first conduit means in communication with said box for conducting gases into said box, said first conduit means having a first end mounted on said box and a second end for placement above a point source, second conduit means having a first end in communication with said box and a second end for placement below said point source, and adsorbent filter means mounted within said gas-tight box and in communication with said exhauster blower whereby gases passing into said box from said first and second conduit means must pass through said adsorbent filter means.

The various aspects of the present invention will be more fully understood when the following portions of the specification are read in conjunction with the accompanying drawings.

BRIEF DESCRIPTION OF THE DRAWINGS

FIG. 1 is a top plan view of the inventive portable adsorber illustrating the device in an operational condition;

FIG. 2 is a side elevational view of the adsorber shown in FIG. 1;

FIG. 5 is a schematic view of the point source adsorber for adsorbing fumes which are both lighter-than-air and heavier-than-air;

FIG. 6 is a fragmentary plan view taken substantially in the direction of arrows 6—6 of FIG. 5, with portions broken away showing the structure of the table box for supporting a specimen which emits fumes which are both lighter-than-air and heavier-than-air;

FIG. 7 is a fragmentary cross sectional view taken substantially along line 7—7 of FIG. 6;

FIG. 8 is a fragmentary cross sectional view taken substantially along line 8—8 of FIG. 6; and FIG. 9 is a fragmentary cross sectional view taken substantially along line 9—9 of FIG. 6 and showing how the table box and its associated duct is connected to the main gas-tight box.

DESCRIPTION OF THE INVENTION

Figure 3:
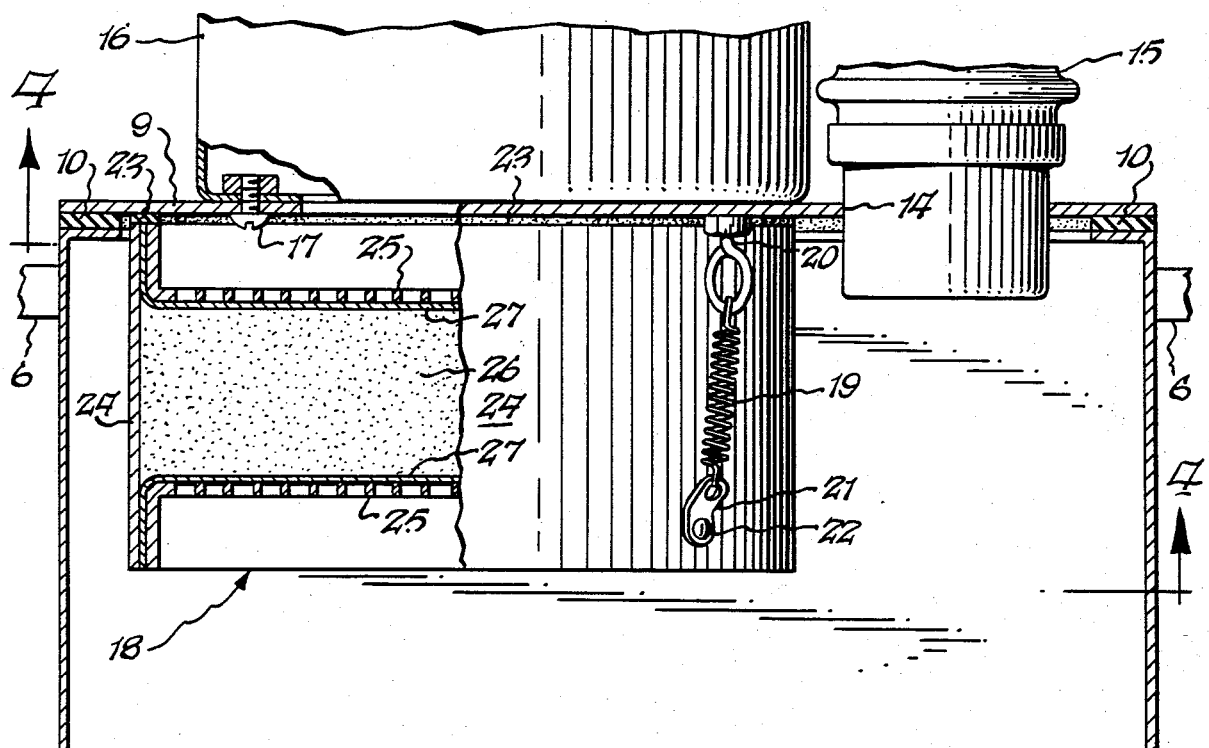
FIG. 3 is an enlarged, fragmentary, transverse sectional view taken generally on line 3—3 of FIG. 1, with parts broken away to more clearly show the details of the device.

As mentioned briefly above, the portable adsorber strategically locates the exhaust duct over source of emanating fumes with minimum interference to operations. The adsorber consists of a gas-tight box 5 for which handles 6 are provided to facilitate movement of the adsorber from one location to another. Quick action fasteners 7, and locating pins 8 to facilitate location of the gas-tight cover 9 with attached elastomeric gasket 10. Fasteners 7 may be of the type known as "Simmons Fasteners". By locking the quick action fasteners on the fastener keepers 11 the cover is attached to gas-tight box 5. The cover 9 contains mounting bracket 12 for the floating arm 13, a cover hole 14 to removably, by means of a friction fit, place flexible duct 15 in, an exhauster blower 16 attached to the outer surface of the cover by screws 17, adsorbent filter 18 held against the inner surface of the cover 9 by quick disconnect connecting springs 19 which are connected to the cover 9 by attached eye bolts and locking nuts 20 and lugs 21 attached to the adsorbent filter 18 by rivets 22. The filter closed celled elastomeric gasket 23 glued to filter as shown in FIGS. 3 and 4 assures that all the fumes travel through the adsorbent filter 18 and no by-passing occurs.

By separation of the cover 9 from the gas-tight box 5 to change the adsorbent filter 18, particulates collected in the bottom of the gas-tight box 5 removed from the air stream in the portable adsorber by the 180° change of direction of the air stream going from the exit of the flexible duct 15 to the adsorbent filter 18 can be disposed of. Turning the wing nuts of the quick release fasteners 7 180° locks or unlocks the cover 9 from the gas-tight box 5 by engaging or disengaging the slides of the quick release fasteners 7 and the fastener keepers 11. Releasing the filter by quick-disconnect connecting springs 19 from the lugs 21 allow the filter to be removed rapidly from the cover.

Figure 4:
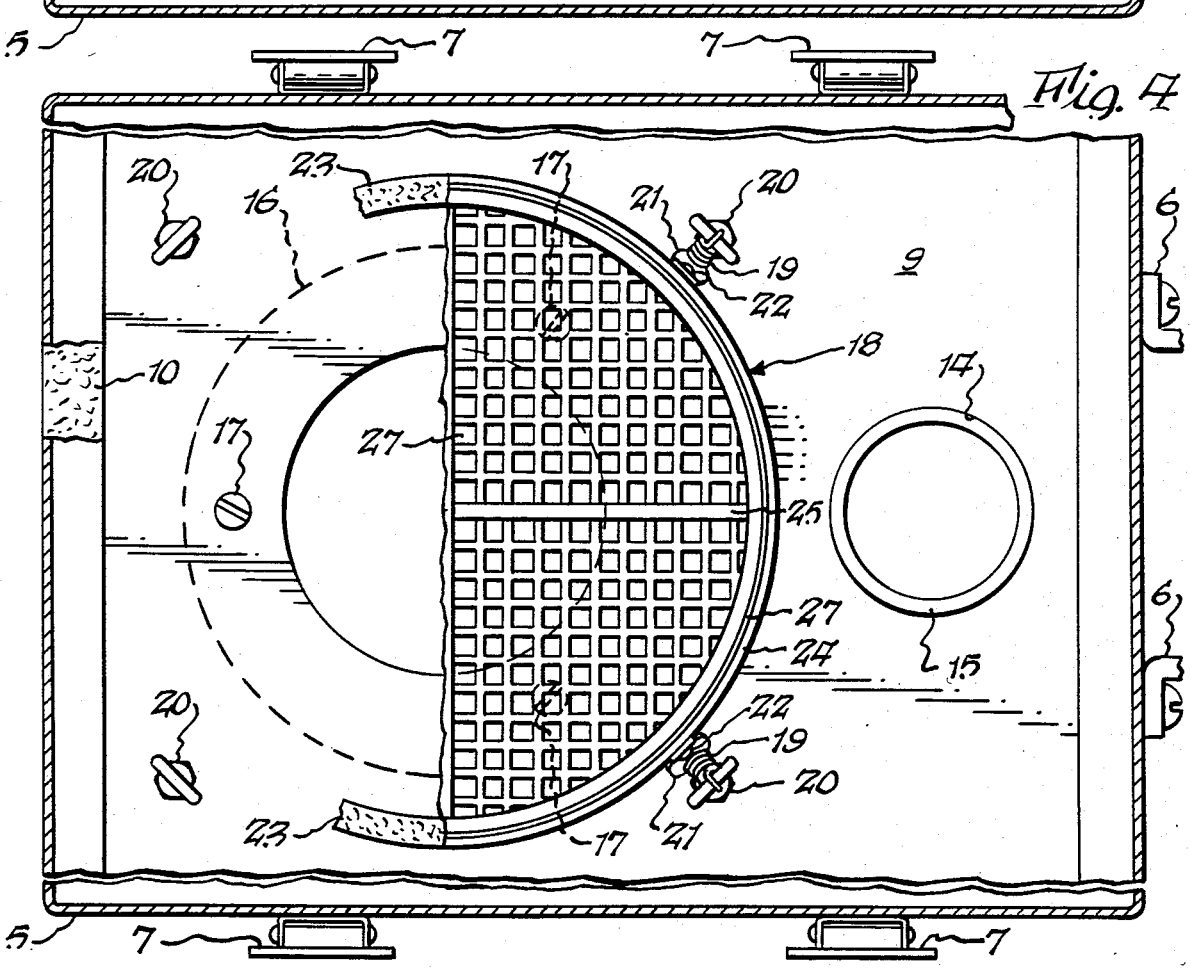
FIG. 4 is a fragmentary, horizontal sectional view taken generally on line 4—4 of FIG. 3.

FIG. 3 includes a cross section view of the adsorbent filter 18 which consists of a paper tube 24, molded end plates 25, adsorbent particles media 26, nonwoven fabric 27 to prevent dusting of the adsorbent media through the molded end plate 25. A closed cell elastomeric gasket 23 is glued to the attached filter end plate 25 and paper tube 24 on the filter surface against the cover 9. The connecting springs 19 provide the tension on the closed cell elastomeric gasket 23 to prevent fume by-passing the adsorbent filter 18.

The flexible duct 15 is attached to the floating arm 13 by means of clamps 28 and the end cap 29 for flexible duct 15 is attached by a clamp 30 to bring the suction strategically near the source generating the fume to thus avoid dilution of the hazardous vapor.

A 24 pound portable adsorber was constructed from a Hoffman (Anoka, MN) electrical box 5 and a cover 9 (10"×12"×6" deep), a 7" diameter filter 18 with a 4" long paper tube 24 containing an adsorbent bed of 2½" of Witco (New York, NY) 965 activated carbon, a Rotron (Woodstock, NY) centrifugal blower was placed over a xylene generating source of cover-slipping where the source concentration is 100 ppm xylene as measured by a Draeger (Lubeck, West Germany) detector at the end cap 29 for the flexible hose 15. The suction velocity at the end cap was 850 fpm as measured by an Anemotherm air meter (Dynamics Corporation—Scranton, PA). A 2½" flexible duct 15 was attached to a floating arm 13 (Luxo LM-1 multipurpose arm—Lux Co., Port Chester, NY). The initial exhaust concentration of air through the filter 18 as measured by Draeger detector tubes was found to be undetectable. After 250 hours of continuous operation, the exhaust concentration reached 20 ppm indicating the adsorbent filter 18 required changing.

In FIGS. 5–9 an embodiment of the present invention is shown which is intended to capture both lighter-than-air fumes and heavier-than-air fumes emanating from a point source. The adsorber 35 includes portions which are substantially identical to the adsorber shown in FIGS. 1–4. In this respect Ohe adsorber 35 includes a flexible duct 15, a gas-tight box 5, an exhauster blower 16, and all of the other parts shown in detail in FIGS. 1–4. The only difference is that a table box 36 is secured to the side 37 of box 5. Table box 36 includes a bottom 38, side walls 39, end wall 40, top wall 41, and end wall 42 having bores 43 therein. Bores 43 are in alignment with bores 44 in wall 37 of box 5. At this point it is to be noted that the only difference between box 5 of FIGS. 1–4 and box 5 of FIG. 5 is the holes 44 in wall 37. Bolts 45 (FIG. 9) extend through walls 42 and 37 to secure table box 36 to wall 37 with holes 43 and 44 in alignment with each other. Thus, the suction created within box 5 evacuates chamber 46 within table box 36.

Wall liners 39' and 40' are secured to the inner surfaces of walls 39 and 40, respectively, and they terminate at shelf-like upper surfaces 47 and 48, respectively. Metal plate 49 has outer edge portions which rest on shelf surfaces 47 and 48. A bar-like bracket 50 provides a shelf-like surface 51 which supports the fourth edge of metal plate 49. Perforations 52 are provided in a square pattern (FIG. 6) proximate the outer periphery of plate 49. However, perforations 52 lie within shelves 47, 48 and 51. An open cell porous foam sheet 53 lies within the quadrangular opening 54 defined by the inner upper surfaces of walls 39 and 40 and the inner surface 55 of table box top 41. Open cell foam sheet 53 covers holes 52 to prevent foreign matter from dropping into chamber 46. An ultra high molecular weight cutting board 56 rests on foam member 53. Plate 56 can be fabricated of any suitable material which will not be deformed by heat, and which preferably will not conduct heat, thereby permitting the specimen 59 to be heated.

In use, a specimen 59 which emits heavier-than-air fumes and lighter-than-air fumes is placed on cutting board 56. The nozzle 60, at the end of flexible duct 15, is placed above specimen 59. The lighter-than-air fumes will be sucked into nozzle 60 and conducted through flexible duct 15 to the interior of box 5. Simultaneously, heavier-than-air fumes which emanate from specimen 59 will be sucked through porous member 53 and perforations 52, and will pass through chamber 46, holes 43 and 44 into the interior of box 5. The lighter-than-air fumes and heavier-than-air fumes will then pass through the filter within gas-tight box 5 and the purified air will be returned to the room from exhauster blower 16.

By way of information, air has a density of 1.291 grams per liter, hydrochloric acid has a density of 1.63 grams per liter, ammonia gas has a density of 0.771 grams per liter, and toluene has a density of 4.28 grams per liter. Thus, for example, if the specimen simultaneously emits ammonia and hydrochloric acid gases, the ammonia gases will rise because they are less dense air while the hydrochloric acid gases will drop because they are denser than air. The device of FIGS. 5–9 will thus capture the rising ammonia gases and will also capture the falling hydrochloric acid gases.

It can thus be seen that the adsorber 35 is capable of capturing lighter-than-air gases, heavier-than-air gases, and both, thereby assuring the treatment and adsorption of all noxious fumes which can emanate from a laboratory specimen. In other words, if it is unknown whether the specimen emits lighter-than-air fumes or heavier-than-air fumes, it is merely required that it be placed above base 56 so that lighter-than-air fumes are captured through flexible duct 15 and heaver-than-air fumes are captured by table box 36.

It can thus be seen that the improved apparatus of the present invention is manifestly capable of achieving the above enumerated objects, and while preferred embodiments have been disclosed, it will be appreciated that the present invention is not limited thereto but may be otherwise embodied within the scope of the following claims.

What is claimed is:

1. A portable point source filter for adsorbing both lighter-than-air fumes and heavier-than-air fumes from a fume emitting specimen comprising a gas-tight box, an exhauster blower mounted on said gas-tight box for exhausting gases from said box, first conduit means in communication with said box for conducting gases into said box, said first conduit means having a first end mounted on said box and a second end for placement above a point source, second conduit means having a first end in communication with said box and a second end for placement below said point source, and adsorbent filter means mounted within said gas-tight box and in communication with said exhauster blower whereby gases passing into said box from said first and second conduit means must pass through said adsorbent filter means.

2. A portable point source filter for adsorbing fumes as set forth in claim 1 wherein said second conduit means comprises a table box defining a chamber, and a perforated top portion on said table box.

3. A portable point source filter for adsorbing fumes as set forth in claim 2 including a supporting plate on said table box for supporting said fume-emitting specimen, and wherein said perforated top portion comprises a perforated plate underlying said supporting plate.

4. A portable point source filter for adsorbing fumes as set forth in claim 3 including a porous sheet interposed between said supporting plate and said perforated plate.

5. A portable point source filter for adsorbing fumes as set forth in claim 1 including outer and inner surface means on said gas-tight box, and said exhauster blower being mounted on said outer surface means.

6. A portable point source filter for adsorbing fumes as set forth in claim 5 wherein said gas-tight box includes a cover and wherein said outer surface means and said inner surface means are also located on said cover, and wherein said exhauster blower is mounted on said outer surface means of said cover, and wherein said adsorbent filter means are mounted on said inner surface means of said cover.

7. A portable point source filter for adsorbing fumes as set forth in claim 6 including inlet means on said cover for mounting said first end of said first conduit means on said cover for passing heavier-than-air fumes into said box, and placement means on said box for mounting said second end of said first conduit means in an area remote from said box.

8. A portable point source filter for adsorbing fumes as set forth in claim 7 wherein said placement means is mounted on said cover.

9. A portable point source filter for adsorbing fumes as set forth in claim 8 wherein said placement means comprises a flexible arm construction.

10. A portable point source filter for adsorbing fumes as set forth in claim 9 wherein said flexible arm construction includes a post, and journal means mounted on said outer surface for receiving said post for pivotal movement.

11. A portable point source filter for adsorbing fumes as set forth in claim 6 including fastener means mounted on said inner surface means of said cover, and means on said fastener means for releasably securing said adsorbent filter means to said inner surface means whereby gases passing into said box from said conduit means must pass through said adsorbent filter means.

12. A portable point source filter for adsorbing fumes as set forth in claim 11 wherein said fastener means comprise springs having first ends secured to said inner surface means of said cover and second ends secured to said adsorbent filter means.

13. A portable point source filter for adsorbing fumes as set forth in claim 12 wherein said adsorbent filter means comprises an elongated housing having first and second ends, and wherein said first end is located in contiguous relationship to said inner surface means of said cover.

14. A portable point source filter for adsorbing fumes as set forth in claim 13 including gasket means on said first end of said housing for providing sealing with said inner surface means of said cover.

15. A portable point source filter for adsorbing fumes as set forth in claim 14 wherein said elongated housing comprises a shell, filter fabric mounted transversely of said shell in the path of gases passing through said shell, and adsorbent material confined by said filter fabric.

16. A portable point source filter for adsorbing fumes as set forth in claim 15 wherein said filter fabric is mounted proximate said first and second ends of said housing with said adsorbent material therebetween.

17. A portable point source filter for adsorbing fumes as set forth in claim 6 including first quick-disconnect means between said cover and the remainder of said box for removing said cover from said box, and second quick-disconnect means for releasably securing said adsorbent filter means from said inner surface means of said cover.

18. A portable point source filter for adsorbing fumes as set forth in claim 7 wherein said inlet means and said filter means are oriented relative to each other to cause gases flowing therebetween to make a 180° turn.

* * * * *